United States Patent
Frisby et al.

(10) Patent No.: US 10,464,206 B2
(45) Date of Patent: Nov. 5, 2019

(54) SMART HOME ROBOT ASSISTANT

(71) Applicant: Vivint, Inc., Provo, UT (US)

(72) Inventors: Wes Frisby, Pleasant Grove, UT (US); Craig Matsuura, Draper, UT (US); Aaron Davis, Pleasant Grove, UT (US)

(73) Assignee: Vivint, Inc., Provo, UT (US)

( * ) Notice: Subject to any disclaimer, the term of this patent is extended or adjusted under 35 U.S.C. 154(b) by 214 days.

(21) Appl. No.: 15/593,475

(22) Filed: May 12, 2017

(65) Prior Publication Data
US 2017/0246739 A1    Aug. 31, 2017

Related U.S. Application Data

(63) Continuation-in-part of application No. 14/530,143, filed on Oct. 31, 2014, now Pat. No. 10,071,475.

(51) Int. Cl.
| | |
|---|---|
| *B25J 9/00* | (2006.01) |
| *B25J 9/16* | (2006.01) |
| *B25J 13/00* | (2006.01) |
| *B25J 11/00* | (2006.01) |
| *E05F 1/00* | (2006.01) |

(Continued)

(52) U.S. Cl.
CPC ........... *B25J 9/0003* (2013.01); *B25J 9/1679* (2013.01); *B25J 11/008* (2013.01); *B25J 13/006* (2013.01); *E05F 1/002* (2013.01); *G05D 1/0282* (2013.01); *A47L 2201/00* (2013.01); *E05F 15/611* (2015.01); *E05Y 2900/132* (2013.01); *G05B 2219/25011* (2013.01); *G05B 2219/25168* (2013.01); *G05B 2219/2642* (2013.01);

(Continued)

(58) Field of Classification Search
CPC ...... B25J 9/0003; B25J 11/008; B25J 9/1679; B25J 13/006; G05D 2201/0215; G05D 1/0282; E05F 1/002; E05F 15/611; E05Y 2900/132; G05B 2219/2642; G05B 2219/25168; G05B 2219/25011; G05B 2219/39001; A47L 2201/00; Y10S 901/01
See application file for complete search history.

(56) References Cited

U.S. PATENT DOCUMENTS

| | | |
|---|---|---|
| 6,909,921 B1 | 6/2005 | Bilger |
| 8,095,238 B2 | 1/2012 | Jones et al. |

(Continued)

OTHER PUBLICATIONS

Ahn, H.S. et al., "PDA-based Mobile Robot System With Remote Monitoring for Home Environment," in IEEE Transactions on Consumer Electronics, vol. 55, No. 3, pp. 1487-1495, Aug. 2009.

(Continued)

*Primary Examiner* — Adam R Mott
(74) *Attorney, Agent, or Firm* — Holland & Hart LLP

(57) ABSTRACT

Methods and systems are described for robot transportation of objects into or out of a home automation system. One example may include determining, by a mobile robotic device, that an object is available to cross a boundary of the home automation system. The method may include deactivating at least a portion of the home automation system. The method also include retrieving, by the mobile robotic device, the object and transporting, by the mobile robotic device, the object across the boundary. The method further includes leaving, by the mobile robotic device, the object at a drop-off location. The method may also include reactivating at least the portion of the home automation system.

17 Claims, 11 Drawing Sheets

(51) Int. Cl.
  *G05D 1/02* (2006.01)
  *E05F 15/611* (2015.01)
(52) U.S. Cl.
  CPC .............. *G05B 2219/39001* (2013.01); *G05D 2201/0215* (2013.01); *Y10S 901/01* (2013.01)

(56) References Cited

U.S. PATENT DOCUMENTS

| | | | |
|---|---|---|---|
| 8,755,936 | B2 | 6/2014 | Friedman et al. |
| 10,207,868 | B1 * | 2/2019 | Stubbs ................... B65G 1/137 |
| 2002/0014953 | A1 | 2/2002 | Stephens et al. |
| 2005/0064916 | A1 | 3/2005 | Ozluturk et al. |
| 2007/0112463 | A1 | 5/2007 | Roh et al. |
| 2011/0238234 | A1 | 9/2011 | Chen |
| 2013/0263034 | A1 | 10/2013 | Bruck et al. |
| 2014/0031977 | A1 | 1/2014 | Goldenberg et al. |
| 2014/0046462 | A1 | 2/2014 | Mets |
| 2014/0207282 | A1 | 7/2014 | Angle et al. |
| 2014/0254896 | A1 | 9/2014 | Zhou et al. |
| 2014/0266669 | A1 * | 9/2014 | Fadell .................. G05B 19/042 340/501 |
| 2015/0120015 | A1 | 4/2015 | Fadell et al. |
| 2015/0120596 | A1 | 4/2015 | Fadell et al. |
| 2015/0145643 | A1 | 5/2015 | Fadell et al. |
| 2015/0156031 | A1 | 6/2015 | Fadell et al. |
| 2015/0310381 | A1 | 10/2015 | Lyman et al. |
| 2016/0331171 | A1 * | 11/2016 | Jiang .................. G06Q 10/0833 |
| 2017/0225336 | A1 * | 8/2017 | Deyle .................... B25J 13/086 |

OTHER PUBLICATIONS

In-Kyu Sa et al., "Intelligent Robot Systems Based on PDA for Home Automation Systems in Ubiquitous," Cutting Edge Robotics 2010, Verdran Kordic.

PCT International Search Report for International Application No. PCT/US2015/056939, dated Mar. 25, 2016 (3 pp.).

Zak Ud Din et al., "Home Automation with Smart Robot Featuring Live Video Feed and Remotely Controlled Switches," 2013 IEEE Conference on Sustainable Utilization and Development in Engineering and Technology, (CSU DET), May 30, 2013-Jun. 1, 2013, pp. 1-6. (http://ieeexplore.ieee.org/xpl/articleDetails.jsp?arnumber=6670975).

Thibodeaux, , "Riley—An Inexpensive Home Security Robot", Home Alarm Report, http://homealarmreport.com/riley-inexpensive-home-security-robot/, published May 10, 2016.

Extended European Search Report for EP Application No. 15855021.0, dated Jun. 12, 2018.

* cited by examiner

SMART HOME ROBOT ASSISTANT

CROSS-REFERENCE

The present Application for Patent is a continuation-in-part of U.S. patent application Ser. No. 14/530,143 filed Oct. 31, 2014, and titled "Smart Home System with Existing Home Robot Platforms," assigned to the assignee hereof, and which is incorporated by reference in its entirety.

BACKGROUND

Existing home robotic systems provide users with a number of useful services. The potential applications of these home robotic systems are plentiful, yet existing home robot platforms are often limited to remaining inside a designated area. For example, automated robots may be restricted inside a house.

As many homes and businesses are increasingly using smart home systems to provide home security, monitor occupancy, temperature, and a number of other building parameters, it may be useful to provide a means for linking these smart home systems to existing mobile robot platforms such that the mobile robotic platforms can exit and enter the parameter of the home automation system. Additionally, it may be beneficial to provide a means by which objects may be transported in or out of the home automation system parameter.

SUMMARY

One example provides a method for robotic delivery in a home automation system. The method may include determining, by a mobile robotic device, that an object is available to cross a boundary of the home automation system and deactivating at least a portion of the home automation system. The method may further include retrieving, by the mobile robotic device, the object, transporting, by the mobile robotic device, the object across the boundary, leaving, by the mobile robotic device, the object at a drop-off location, and reactivating at least the portion of the home automation system.

Other example methods may include detecting, by the mobile robotic device, the object via one or more sensors of the mobile robotic device. The method may also include receiving, at the mobile robotic device, a notification from the home automation system identifying the object, wherein determining that the object is available to cross the boundary of the home automation system is based at least in part on the notification. In other examples, the method includes receiving, at the mobile robotic device, an instruction from the home automation system to retrieve the object.

In some examples, the object is a delivery package. The method may further include detecting, via one or more sensors of the mobile robotic device, the delivery package located outside the boundary of the home automation system, wherein deactivating at least the portion of the home automation system further comprises deactivating a security lock or alarm system for a door associated with the home automation system, and wherein transporting the object across the boundary further comprises carrying, by the mobile robotic device, the delivery package inside the boundary of the home automation system through the door. The method may also include determining the delivery package has been delivered via tracking information. In other examples, the method includes determining the drop-off location for the delivery package based at least on a name on the delivery package, a type of one or more items delivered, a code on the delivery package, tracking information, instructions from the home automation system, instructions from an administrator of the home automation system, or combinations thereof.

The method may also include determining a time window for delivery of the delivery package and looking for the object during the time window. In other examples, the method may include providing an alert to an administrator of the home automation system that the delivery package has arrived, requesting authorization to deactivate the portion of the home automation system based at least in part on the arrival of the delivery package, and receiving authorization to temporary deactivate at least the portion of the home automation system, wherein deactivating at least the portion of the home automation system is only performed upon receiving the authorization.

Some examples of the method include providing an alert to the administrator based at least in part on the deactivating. The method may include performing a safety inspection of the object, wherein transporting the object across the boundary is only performed when the object passes the safety inspection. The method may also include detecting the drop-off location as a clear space to place the object.

In some examples, the object is a package to be delivered, garbage, recycling, one or more plants, a pet, or an item requested by a user of the home automation system.

In another example, a mobile robot device is provided. The mobile robot device may include one or more sensors or devices configured to determine that an object is available to cross a boundary of the home automation system, deactivate at least a portion of the home automation system, retrieve the object, transport the object across the boundary, leave the object at a drop-off location, and reactivate at least the portion of the home automation system.

In yet another example, a home automation system apparatus is provided. The apparatus may include one or more sensors to detect that an object is available to cross a boundary of the home automation system and a processor. The processor may determine action instructions for a mobile robotic device to retrieve the object and temporarily deactivate at least a portion of a security system of the home automation system apparatus during a duration of the retrieval. The apparatus may also include a transmitter to communicate the action instructions to a mobile robotic device that causes the mobile robotic device to retrieve the object, transport the object across a boundary of the home automation system, and leave the object at a drop-off location.

In another example of the apparatus, the object is a delivery package. The one or more sensors that may detect that the delivery package is available may further scan a delivery area with one or more cameras, detect a new object within the scanned area, and determine that the new object is the delivery package. In some examples, the processor performs part of these features.

The processor may further request authorization from an administrator of the home automation system to temporarily deactivate at least the portion of the security system of the home automation system apparatus for retrieval of the object, receive the authorization to temporarily deactivate at least the portion of the security system, and temporarily deactivate at least the portion of the security system only in response to receiving the authorization.

In some examples, the processor may further determine a door of a building associated with the home automation system for which the object should pass through, deactivate a security system for the door, monitor the location of the mobile robot device, and reactivate the security system for the door once the mobile robot device has crossed the door with the object.

In examples where the object is a delivery package, the processor may further determine a time window that the delivery package is expected to arrive based on tracking information and identify the delivery package using sensor data during the time window.

The processor may further determine a drop-off location for the delivery package based on one or more of the tracking information or information located on the delivery package and include the drop-off location in the action instructions.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the embodiments may be realized with reference to the following drawings. In the appended figures, similar components or features may have the same reference label. Further, various components of the same type may be distinguished by following the reference label with a dash and a second label that distinguishes among the similar components. If only the first reference label is used in the specification, the description is applicable to any one of the similar components having the same first reference label irrespective of the second reference label.

Figure 1:
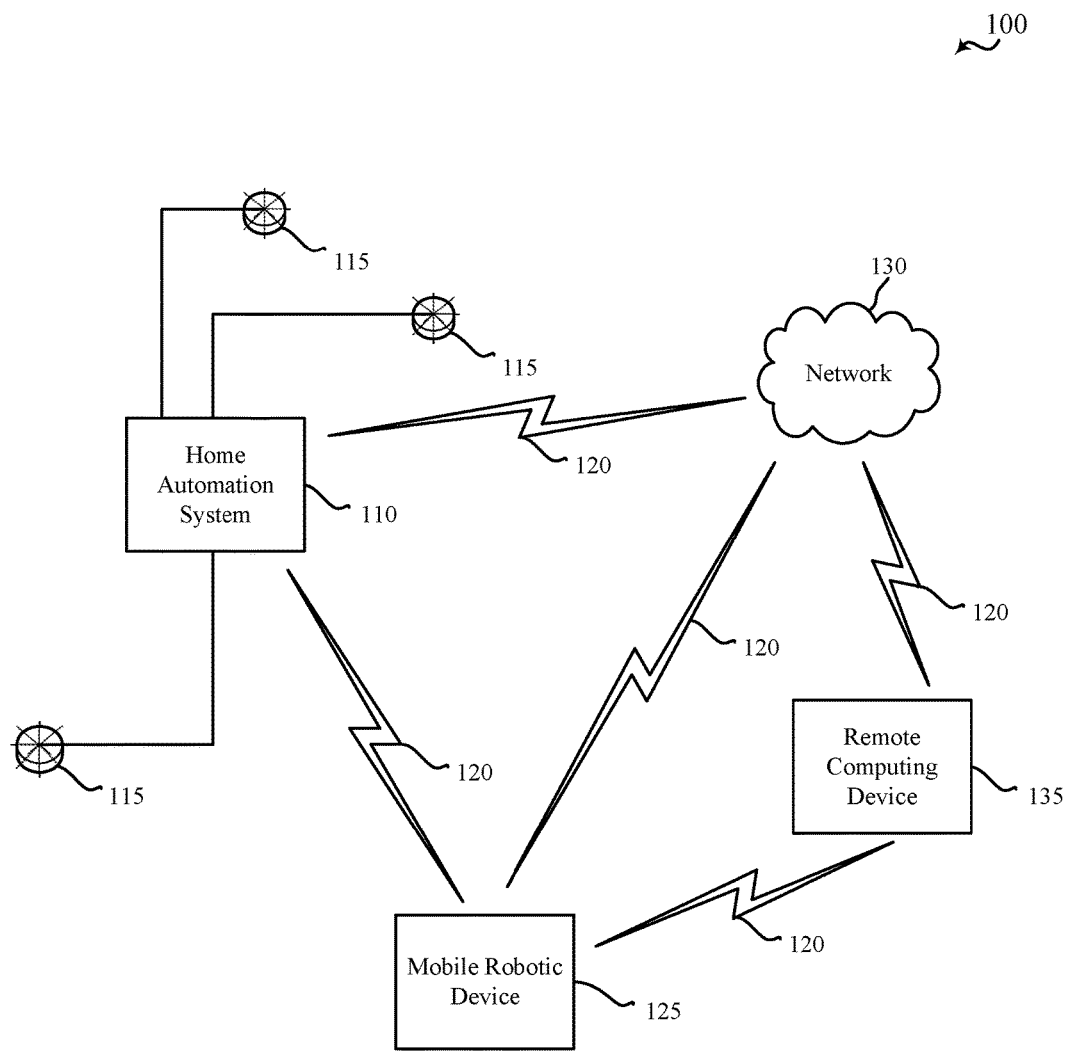
FIG. 1 is a block diagram of an example mobile robotic device communication system in accordance with various embodiments.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The systems and methods described herein may relate to transporting objects across a boundary of a home automation system. More specifically, the systems and methods described may determine an object needs to be brought inside a home or removed from the home, and a mobile robotic platform works with the home automation system to transport the object across a boundary of the home automation system.

Additionally, it may be advantageous to provide a means for mobile robotic devices to ingress and egress the boundary of the home automation system without triggering any alarms. For example, the home automation system may temporarily deactivate one or more alarms or unlock one or more doors in order to enable the mobile robotic device to exit or enter the home. In some examples, an object is removed from the home and in other examples, an object brought to the home by another entity is brought inside the home. Authorization may be obtained from an authorized user of the home automation system (such as an owner of the home) before an object is brought in or removed. In some other examples, the object is inspected for safety before it is brought in the home.

FIG. 1 is a block diagram illustrating one embodiment of a mobile robotic device communication system 100 in which the present systems and methods may be implemented. In some embodiments, the mobile robotic device communication system 100 may include a home automation system 110, one or more sensor units 115, a mobile robotic device 125, a network 130, and a remote computing device 135. The home automation system 110 may communicate via wired or wireless communication links 120 with one or more of the mobile robotic device 125 and the network 130. The network 130 may also communicate via wired or wireless communication links 120 with the remote computing device 135. In alternate embodiments, the network 130 may be integrated with the remote computing device 135, such that separate components are not required. The network 130 may also communicate, or be part of, a network-based cloud system.

Although labeled as a home automation system, the component 110 may be any system operable to monitor and control parameters for locations. Such systems may include a system to monitor and control parameters for a building, a group of buildings, a property, a vehicle, or any other type of structure. One alternative example includes a business automation system.

The home automation system 110 may be operable to both control aspects of a property as well as to receive and display notifications regarding monitored activity of a property. Examples of the home automation system 110 may include a dedicated home automation computing device (e.g., wall-mounted controller), a personal computing device (e.g., laptop, desktop, etc.), a mobile computing device (e.g., tablet computing device, smartphone, etc.), and the like.

The home automation system 110 may have a boundary that separates an area that the home automation system 110 monitors and controls from an area that it does not monitor or control. For example, the boundary of the home automation system 110 may be the perimeter of a building into which the home automation system 110 is incorporated. In some examples, the home automation system 110 may have an internal boundary, where the home automation system 110 monitors and controls an inner portion of a property that is monitored and controlled. For example, the boundary may be the perimeter of a building while the home automation system 110 also monitors and/or controls at least some of the grounds around the building. In another example, the boundary may be one or more rooms within a monitored building (e.g., a secured laboratory or storage room, a personal bedroom, and the like). A user or administrator of the home automation system 110 may define one or more boundaries of the home automation system 110. Doors, windows, and other means of egress and ingress to a building or an area within a building may be monitored as part of the boundary of the home automation system 110.

The home automation system 110 may communicate, or be integrated, with one or more of the sensor units 115. The sensor units 115 may be distributed throughout a property, including within a boundary of the home automation system 110 and without the boundary. Examples of the sensor units 115 may include any one or more of a camera sensor, audio sensor, forced entry sensor, shock sensor, proximity sensor, boundary sensor, appliance sensor, light fixture sensor, temperature sensor, light beam sensor, three-dimensional (3-D) sensor, motion sensor, smoke sensor, glass break sensor, door sensor, window sensor, carbon monoxide sensor, accelerometer, global navigation satellite system (GNSS), such as a global positioning system (GPS), sensor, Wi-Fi positioning system sensor, capacitance sensor, chemoreceptor, odor sensor, infrared sensor, radio frequency sensor, near-field sensor, pressure sensor, seismic sensor, radar sensor, LIDAR sensor, heartbeat sensor, breathing sensor, oxygen sensor, carbon dioxide sensor, brain wave sensor, voice sensor, and the like.

The sensor units 115 may represent one or more separate sensors or a combination of two or more sensors in a single sensor device. For example, a sensor unit 115 may represent one or more camera sensors and one or more motion sensors connected to home automation system 110. Additionally or alternatively, a sensor unit 115 may represent a combination sensor such as both a camera sensor and a motion sensor integrated in the same sensor device. Although the sensor units 115 are depicted as connecting directly to the home automation system 110, the sensor units 115 may alternatively connect to the home automation system 110 via a wired or wireless communication link 120, or via the network 130. Additionally or alternatively, the sensor units 115 may be integrated with a home appliance or fixture, such as a light bulb. In some embodiments, the sensor unit 115 may include an accelerometer to enable the sensor unit 115 to detect movement. In some embodiments, one or more of the sensor units 115 may include a wireless communication device enabling the sensor unit 115 to send and receive data and/or information to and from one or more devices. Additionally or alternatively, the sensor unit 115 may include a GPS sensor to enable the sensor unit 115 to track a location of the sensor unit 115. The sensor unit 115 may include a proximity sensor to enable the sensor unit 115 to detect proximity of a person or other entity relative to a predetermined distance from a dwelling (e.g., geo-fencing). In some embodiments, the sensor unit 115 may include one or more security detection sensors such as, for example, a glass break sensor, a motion detection sensor, or both. Additionally or alternatively, the sensor unit 115 may include a smoke detection sensor, a carbon monoxide sensor, or both.

The mobile robotic device 125 may be any mobile robotic device that can be used in home or business applications. The mobile robotic device 125 may be a drone capable of flight or a ground-based robot. In examples where the mobile robotic device 125 is a drone, the mobile robotic device 125 may be operable to fly within and outside the home automation system 110. In some examples, the mobile robotic device 125 may be an android style robot that moves over the ground or floor (e.g., walks on legs, rolls, spins, etc.). The mobile robotic device 125 may be able to inspect an object, pick up the object, transport the object, and drop or set the object down.

In order to receive action instructions and/or input data, the mobile robotic device 125 may include a wired or wireless transceiver, as well as one or more sensor units. The existing mobile robotic devices 125 may additionally be operable to receive and process input data from one or more sensors positioned on or integrated with the mobile robotic devices 125. The mobile robotic device 125 may forward the sensed data to the home automation system 110, such that the home automation system 110 may provide updated action instructions to the mobile robotic device 125. Alternatively, the mobile robotic device 125 may receive input data from the one or more sensors positioned on or integrated with the mobile robotic device 125, and may obtain and execute action instructions locally based on input data, without the need for interaction with the home automation system 110.

In some examples the mobile robotic device 125 is a commercially available robot such as an iRobot Roomba®, Scooba®, Braava®, 110 FirstLook®, or Ava®, or a Husqvarna Automower®, or one of the many commercially available drones. In some examples, the mobile robotic device 125 is retrofitted to include one or more wired or wireless transceivers or one or more sensor units. Alternatively, in mobile robotic devices 125 that already have Wi-Fi or other communication capabilities, an additional transceiver may not be necessary. With the addition of these components, the existing mobile robotic devices 125 may become operable to receive action instructions from the home automation system 110 or the remote computing device 135. In some examples, the mobile robotic device 125 is retrofitted to include one or more retrieval apparatus.

In some embodiments, the mobile robotic device 125 may communicate input data received from one or more sensors positioned on or within the mobile robotic device 125 to the home automation system 110 or the remote computing device 135 in real-time such that the home automation system 110 or a user may make decisions regarding action instructions. For example, a mobile robotic device 125 having a video camera attached thereon may send video data to a user's smart phone showing that a delivery package has arrived at the front door, such that the user may elect have the delivery package brought inside, and may send action instructions to the mobile robotic device 125 directing the mobile robotic device 125 to bring the delivery package inside. In some embodiments, input data from sensors positioned on the mobile robotic device 125 may be transmitted to the home automation system 110 either at the initiative of the mobile robotic device 125 or in response to a request from the home automation system 110.

In other embodiments, a user or home automation system 110 may communicate action instructions to the mobile robotic device 125 to inspect an object for safety. For example, upon receiving an alert at the home automation system 110 via the one or more sensor units 115 that a delivery package has arrived at the home, the home automation system 110 may communicate an action instruction to the mobile robotic device 125 to relocate to the package and collect any relevant data, such as reading an address on the package, reading a code on the package such as a bar code or a quick response (QR) code, etc., and convey that data to the home automation system 110 or to the remote computing device 135.

In some embodiments, the mobile robotic device 125 may be used in concert with existing home devices, fixtures, or appliances by transmitting commands via wireless signals to the devices, appliances, or fixtures. For example, a mobile robotic device 125 may navigate to within Bluetooth range of a device having Bluetooth connectivity, and may instruct the device to take an action via Bluetooth-transmitted commands. For example, the mobile robotic device 125 may instruct a door to unlock or turn a device on or off, such as a speaker or intercom system. In other examples, a mobile robotic device 125 may transmit a command to, for example, a television via a Wi-Fi connection to turn off or on. While existing smart home systems may be operable to perform some of these tasks, the mobile robotic device 125 may also perform these tasks. In some examples, in areas proximate to or of the home automation system 110 that might be Wi-Fi "dead zones," the mobile robotic device 125 may be operable to extend the Wi-Fi functionality of the home automation system 110. Similarly, in or where the sensors 115 cannot make any detections in areas proximate to or of the home automation system 110, the mobile robotic device 125 may be operable to extend the sensing functionality of the home automation system 110.

The remote computing device 135 may be a custom computing entity configured to interact with the sensor units 115 via the network 130. In other embodiments, the remote computing device 135 may be a general purpose computing entity such as a personal computing device (PC), for example, a desktop computer, a laptop computer, a netbook, a tablet PC, a control panel, an indicator panel, a multi-site dashboard, an iPod®, an iPad®, a smart phone, a mobile phone, a personal digital assistant (PDA), and/or any other suitable device operable to send and receive signals, store and retrieve data, and/or execute modules.

In some embodiments, the one or more sensor units 115 may be sensors configured to conduct periodic or ongoing automatic measurements related to home security, environment, occupancy, or other relevant property-related data. Each sensor unit 115 may be capable of sensing multiple home security, environment or occupancy data parameters, or alternatively, separate sensor units 115 may monitor separate home data parameters. For example, one sensor unit 115 may detect motion to determine that someone has approached a door, such as a delivery person. Another sensor unit 115 may visually detect that a delivery package has arrived outside the home automation system 110. In another example, a sensor unit 115 may be a chemoreceptor that determines when a garbage bag should be removed from the premises.

Data gathered by the one or more sensor units 115 may be communicated to the home automation system 110, which may be, in some embodiments, a wall-mounted input/output display. The home automation system 110 may process the data received from the one or more sensor units 115 to obtain action instructions. In alternate embodiments, a user may input data directly at the home automation system 110 or at remote computing device 135, such that action instructions may be obtained based wholly or in part on user inputted data. Action instructions obtained at the home automation system 110 may then be communicated via a wired or wireless communication link 120 to the mobile robotic device 125 or to the network 130. Action instructions communicated to the network 130 may be communicated via a wired or wireless communication link 120 to the remote computing device 135, and may in turn be communicated to the mobile robotic device 125 via wired or wireless communication link 120. Action instructions received at the mobile robotic device 125 may then be executed by the mobile robotic device 125. In some embodiments, described in more detail below, inputted data may also be collected by the mobile robotic device 125 and may be communicated via wired or wireless communication link 120 to the remote computing device 135 and/or the home automation system 110.

In some embodiments, the home automation system 110 may communicate with the remote computing device 135 via network 130. Examples of the network 130 includes cloud networks, local area networks (LAN), wide area networks (WAN), virtual private networks (VPN), wireless networks (using 802.11, for example), and/or cellular networks (using 3G and/or LTE, for example), or the like. In some configurations, the network 130 may include the Internet. In some embodiments, a user may access the functions of the home automation system 110 from the remote computing device 135. For example, in some embodiments, the remote computing device 135 may include a mobile application that interfaces with one or more functions of the home automation system 110.

Figure 2:
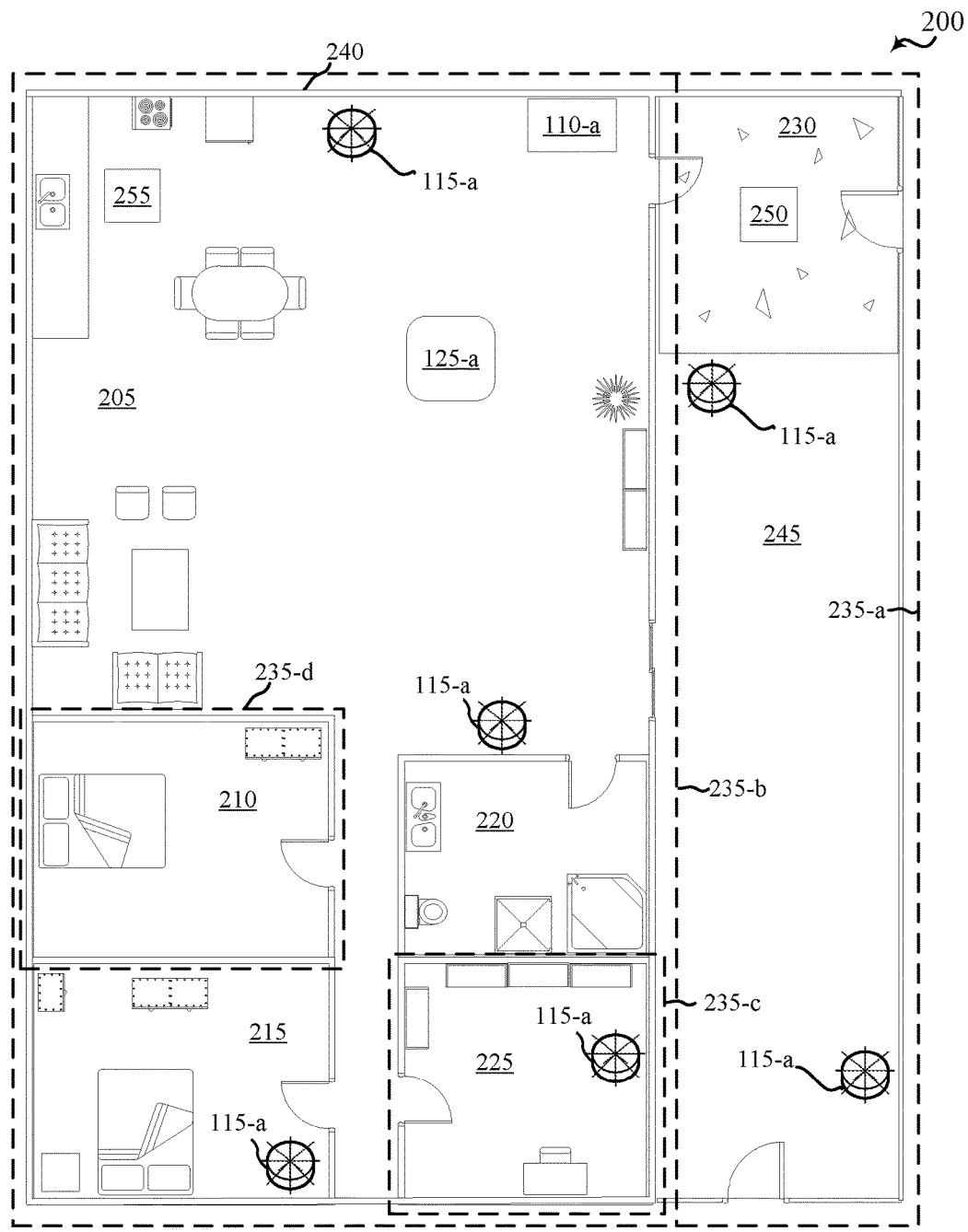
FIG. 2 is a schematic diagram of one example of a home with a home automation system and a mobile robotic device in accordance with various embodiments.

FIG. 2 is a schematic diagram of one example of a home 200 with a home automation system 110-*a* and a mobile robotic device 125-*a* in accordance with various embodiments. The mobile robotic device 125-*a* may be an example of one or more aspects of the mobile robotic device 125-*a* of FIG. 1. The home automation system 110-*a* may be an example of one or more aspects of the home automation system 110 of FIG. 1. The home 200 may include the mobile robotic device communication system 100 described with reference to FIG. 1.

The home 200 includes a building 240 and a yard 245. The building 240 includes rooms 205, 210, 215, 220, and 225 and the yard 245 includes a porch 230. Several sensor units 115-*a* are distributed about the home 200 and are in communication with the home automation system 110-*a*. The sensor units 115-*a* may be an example of one or more aspects of the sensor units 115 of FIG. 1. The size, location, number, and design of the home 200 is merely illustrative. Furthermore, the home may be any other type of building or property. Other examples may include more or less rooms and sensor units 115-*a*, additional home automation system 110-*a* that may be integrated with a different part of the property, and two or more mobile robotic devices 125-*a*.

In the example of FIG. 1, the home 200 has four boundaries 235-*a*, 235-*b*, 235-*c*, and 235-*d*. The boundary 235-*a* is a virtual boundary around the property of the home 200. In this example, the home automation system 110 monitors and controls various functionalities of the home within the boundary 235-*a* but not external to it. That is, the boundary 235-*a* separates an area that the home automation system 110 monitors and controls from an area that it does not monitor or control. However, within the boundary 235-*a*, the home automation system 110 may have different levels of control. For example, the boundary 235-*a* includes the building 240 but does not include the yard 245. In one example, the home automation system 110 may restrict access to the building 240 while not restricting access to the yard 245. One example of the home automation system 110 restricting access is to maintain the doors and windows to the building 240 in a locked state. The home automation system 110 may unlock a portion of the building 240 to allow ingress or egress, for example, by authorized users or the mobile robotic device 125-*a*.

The boundaries 235-*c* and 235-*d* are illustrated as boundaries internal to the building 240. For example, the boundary 235-*c* includes an office room 225 and the boundary 235-*d* includes a bedroom 210. The home automation system 110 may be able to control access to either of the rooms 210 and 225. In this particular example, the home automation system 110 has no sensor units 115-*a* in the bedroom 210 but does have at least one sensor unit 115-*a* in the office 225. In other examples, other rooms and sensor units 115-*a* may be used.

An object 250 may be located on the porch 230, outside of the boundary 235-*b*. The object 250 may be, for example, a delivery package dropped off by a delivery service or a neighbor or friend. In another example, the object 250 may be an item that belongs to the home 240 and is currently located outside, such as a garbage or recycling bin, plants, or the like. In some examples, the object 250 may be one or more items, such as letters in the mail. One or more of the home automation system 110, the mobile robotic device 125-*a*, or a user may detect that the object 250 is available to cross the boundary 235-*b* of the home automation system 110. Once the object 250 has been detected, the mobile robotic device 125-*a*, with or without obtaining permission from an authorized user of the home automation system 110, may retrieve the object 250.

The home automation system 110 may deactivate a portion of itself to allow the mobile robotic device 125-*a* to leave the boundary 235-*b*. The deactivation may include, for example, unlocking a door or turning off an alarm for the door. Because in this example the mobile robotic device 125-*a* is located within the boundary 235-*b*, the home automation system 110 deactivates a portion of itself to enable the mobile robotic device 125-*a* to exit the building 240, crossing the boundary 235-*b*, to relocate to the object 250. In some examples, the home automation system 110 monitors the location and progress of the mobile robotic device 125-*a* in order to know when to deactivate and reactivate at least the portion of the home automation system 110. In other examples, the home automation system 110 deactivates the portion for a specific time duration. In other examples, the home automation system 110 deactivates and reactivates the portion at least partially based on requests from the mobile robotic device 125-*a*. In other examples, the home automation system 110 deactivates and reactivates the portion at least partially based on requests from an authorized user.

The mobile robotic device 125-*a* may approach the object 250 and inspect it. The mobile robotic device 125-*a* may determine a name associated with the object 250 (e.g., a name to which the delivery package is addressed), a source of the object 250, tracking information for the object 250, a type of object 250, and a drop-off location for the object 250. The mobile robotic device 125-*a* may also inspect the object 250 for safety (e.g., ensuring that the object 250 is safe to bring inside the building 240 and is not, for example, a bomb or other dangerous material). The mobile robotic device 125-*a* may determine the object 250 is within a threshold safety level by confirming the object 250 was expected.

Some ways to determine the object 250 was expected include that the object 250 matches tracking information for an item a user of the home automation system 110 has ordered, the user provided a notification that the object 250 was expected, the delivery service or person provided a notification that the object 250 was delivered, or the like. The mobile robotic device 125-*a* may also sense information about the package, such as size, weight, density, chemical contents, emission of energy, or the like. The mobile robotic device 125-*a* may compare these features to information stored or accessed that may indicate the object 250 is unsafe. In some cases, the user indicates the object 250 is safe or unsafe. In some examples, the home automation system 110 or a user determines some or all of this information, alternatively or in addition to the mobile robotic device 125-*a*.

If the object 250 is determined appropriate to bring inside the building 240, the mobile robotic device 125-*a* may pick up the object 250 and transport it inside the building 240, traveling across the boundary 235-*b*. Once inside, the home automation system 110 may reactivate the portion that was deactivated, which may include locking the door or window used by the mobile robotic device 125-*a* or activating the alarm system. The home automation system 110 may provide a notification to the mobile robotic device 125-*a* or a user that the deactivated portion of the home automation system 110 has been reactivated.

The mobile robotic device 125-*a* may determine a drop-off location for the object 250. In one example, the drop-off location may be the room 210. The mobile robotic device 125-*a* may transport the object 250 to the room 210 and drop or set the object 250 down within the room 210.

In another example, there may be an object 255 that is within the boundary 235-*b* but needs to be relocated outside. For example, the object 255 may be garbage or recycling, mail to be picked up, or an object requested by a friend or neighbor. The home automation system 110 may deactivate a portion of the home automation system 110 to allow the mobile robotic device 125-*a* to transport the object 255 across the boundary 235-*b* without triggering alarms. The mobile robotic device 125-*a* may retrieve the object 255, transport it across the boundary 235-*b*, and drop it off at a drop-off location. The drop-off location may be, for example, a curb, a mailbox, or a location on the porch 230 or in the yard 245. In other examples, the drop-off location could be located further from the home 200, such as a neighbor's house, a business, or another location.

Once the object 250 is located outside the boundary 235-*b*, the home automation system 110 may reactivate the portion. In some examples, the home automation system 110 reactivates the portion immediately upon the mobile robotic device 125-*a* crossing the boundary 235-*b* while in other examples the home automation system 110 waits until the mobile robotic device 125-*a* has returned within the boundary 235-*b* to reactivate the portion.

Figure 3:
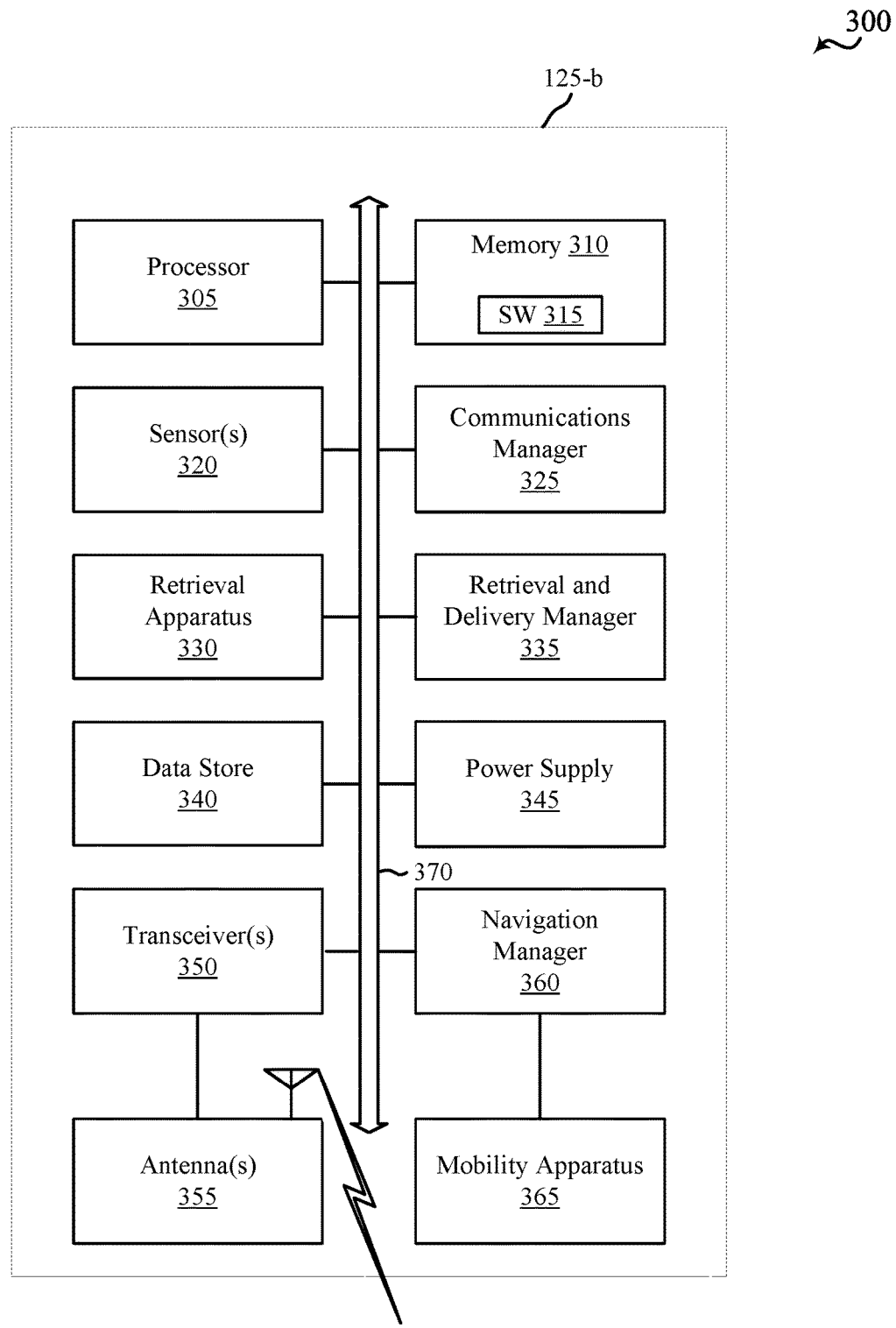
FIG. 3 is a block diagram of an example of a mobile robotic device in accordance with various embodiments.

FIG. 3 is a block diagram 300 of an example of a mobile robotic device 125-*b* in accordance with various embodiments. The mobile robotic device 125-*b* may be an example of one or more aspects of the mobile robotic device 125 of FIGS. 1 and 2. The mobile robotic device 125-*b* may be configured to retrieve an object and transport it across a boundary of a home automation system 110. The mobile robotic device 125-*b* may be an autonomous device that can move about on its own.

The mobile robotic device 125-*b* may have an internal power supply 345, such as a rechargeable battery, to facilitate mobile operation. The mobile robotic device 125-*b* may include a processor 305, a memory 310, a one or more transceivers 350, one or more antennas 355, one or more sensors 320, and a data store 340. The mobile robotic device 125-*b* may also include a retrieval apparatus 330 and a retrieval and delivery manager 335. The mobile robotic device 125-*b* may also include a mobility apparatus 365 and a navigation manager 360. Each of these components may be in communication with each other, directly or indirectly, over at least one bus 370. The mobile robotic device 125-*b* may have various other configurations in other examples.

The memory 310 may include RAM and ROM. The memory 310 may store computer-readable, computer-executable software code 315 containing instructions that are configured to, when executed, cause the processor 305 to perform various functions described herein for retrieval and transportation of objects. The memory 310 may also store information about expected deliveries, object recognition information, information about the home automation system 110, information about users of the home automation system 110, and the like. Alternatively, the software code 315 may not be directly executable by the processor 305 but be configured to cause the processor 305 (e.g., when compiled and executed) to perform functions described herein.

The processor 305 may include an intelligent hardware device, e.g., a CPU, a microcontroller, an ASIC, etc. The processor 305 may process information received through the one or more sensors 320 or transceivers 350 and/or to be sent to the one or more transceivers 350 for transmission through the antennas 355. The processor 305 may handle, alone or in connection with the retrieval and delivery manager 335 or the navigation manager 360, various aspects for retrieval and transportation of objects.

The one or more transceivers 350 may be configured to communicate bi-directionally with the home automation system 110 described in FIGS. 1-2 or the remote computing device 135 or the network 130 as described in FIG. 1. The one or more transceivers 350 may be implemented as at least one transmitter and at least one separate receiver. The one or more transceivers 350 may include a modem configured to modulate packets and provide the modulated packets to the antennas 355 for transmission, and to demodulate packets received from the antennas 355. While the mobile robotic device 125-*b* may include a single antenna, there may be aspects in which the mobile robotic device 125-*b* may include multiple antennas 355. The mobile robotic device 125-*b* may also include one or more radio access technologies, including Wi-Fi, radio frequency, infrared, or cellular technologies.

According to the architecture of FIG. 3, the mobile robotic device 125-*b* may further include a communications manager 325. The communications manager 325 may manage communications with various access points. The communications manager 325 may be a component of the mobile robotic device 125-*b* in communication with some or all of the other components of the mobile robotic device 125-*b* over the at least one bus 370. Alternatively, functionality of the communications manager 325 may be implemented as a component of the one or more transceivers 350, as a computer program product, and/or as at least one controller element of the processor 305.

Examples of the sensors 320 may include any one or more of a camera sensor, audio sensor, shock sensor, proximity sensor, boundary sensor, temperature sensor, light beam sensor, 3-D sensor, motion sensor, smoke sensor, carbon monoxide sensor, accelerometer, gyroscope, GNSS or GPS sensor, Wi-Fi positioning system sensor, capacitance sensor, chemoreceptor, odor sensor, infrared sensor, radio frequency sensor, near-field sensor, pressure sensor, seismic sensor, radar sensor, LIDAR sensor, heartbeat sensor, breathing sensor, oxygen sensor, carbon dioxide sensor, brain wave sensor, voice sensor, and the like.

The mobility apparatus 365 may be any apparatus that enables the mobile robotic device 125-*b* to move. Examples of the mobility apparatus 365 may include one or more wheels, legs, feet, tracks, wings, airfoils, blades, rudders, elevators, propellers, rotors, or any other device that may be used to move the mobile robotic device 125-*b*. The mobility apparatus 365 may also include some of the machinery that is used to propel the mobile robotic device 125-*b*, such as a motor and related structure. The navigation manager 360 may operate and instruct the mobility apparatus 365. The navigation manager 360 may also aid in positioning, navigation, orientation, and balance for the mobile robotic device 125-*b*.

The retrieval apparatus 330 may be any apparatus that enables the mobile robotic device 125-*b* to retrieve and drop off an object. Examples of the retrieval apparatus 330 may include one or more arms, hands, claws, feet, grasping device, magnets, electromotive force generator, suction cups, vacuum devices, or the like. In some examples, the retrieval apparatus 330 may be a part on the mobile robotic device 125-*b* where someone or another robotic device can place an object. The retrieval and delivery manager 335 may operate and instruct the retrieval apparatus 330. The retrieval and delivery manager 335 may instruct the retrieval apparatus 330 to pick up an object, carry the object, and drop the object off at a desired location.

The components of the mobile robotic device 125-*b* may be configured to implement aspects discussed above with respect to FIGS. 1-2, and those aspects may not be repeated here for the sake of brevity. Moreover, the components of the mobile robotic device 125-*b* may be configured to implement aspects discussed below with respect to FIGS. 5-6 and 8-12, and those aspects may not be repeated here also for the sake of brevity.

Figure 4:
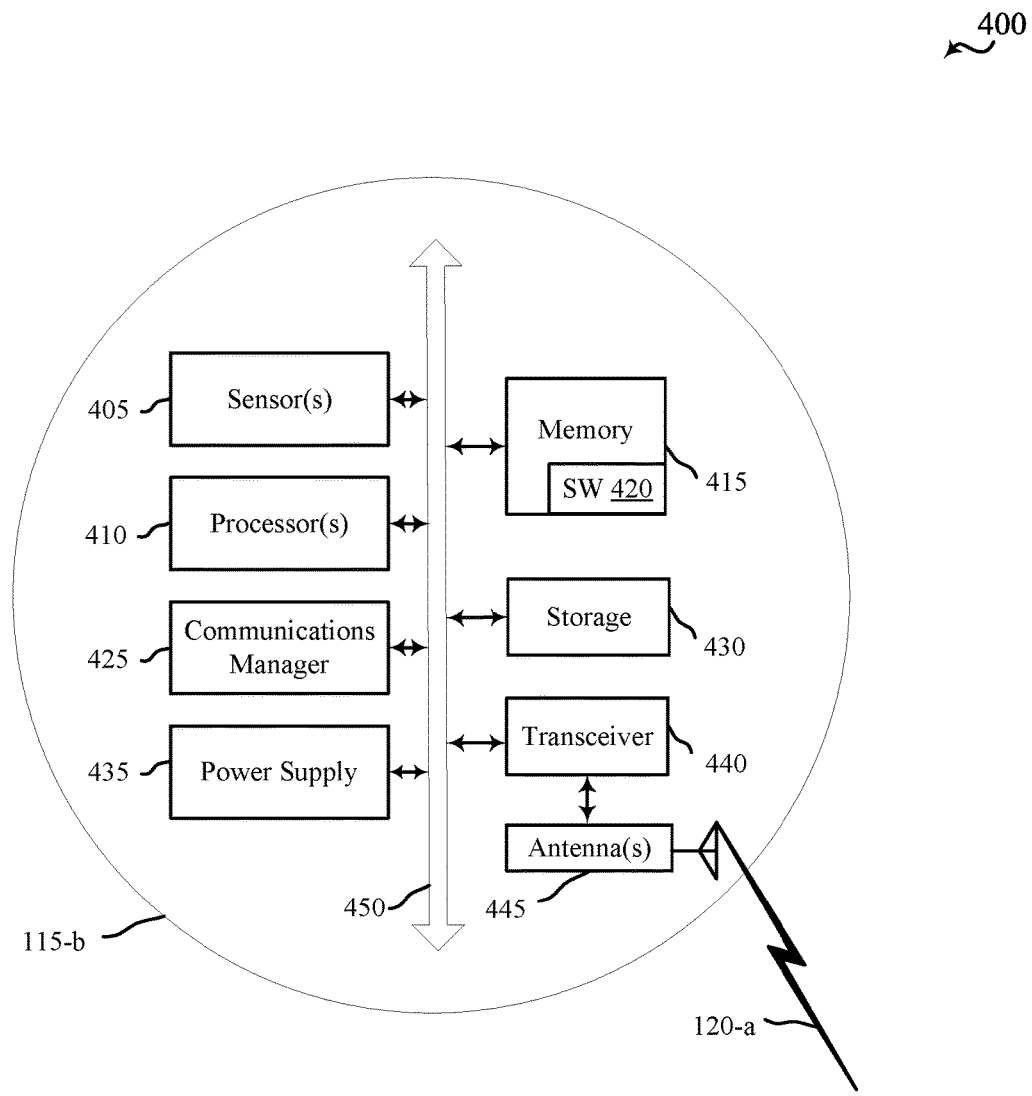
FIG. 4 is a block diagram of an example of a sensing apparatus for receiving home security data in accordance with various embodiments.

FIG. 4 is a block diagram 400 of an example of a sensor unit 115-*b* for receiving home security data in accordance with various embodiments. The sensor unit 115-*b* may be an example of one or more aspects of the sensors unit 115 of FIGS. 1 and 2. The sensor unit 115-*a* may be configured to implement at least some of the features and functions described with reference to FIGS. 1 and 2. The sensor unit 115-*b* may be configured to collecting home security, occupancy, and other property-related data for the home automation system 110. The sensor unit 115-*a* may have various configurations.

The sensor unit 115-*a* may include one or more sensors 405, a processor 410, a memory 415, a communications manager 425, at least one transceiver 440, at least one antenna (represented by antennas 445), a storage module 430, and/or a power supply 435. Each of these components may be in communication with each other, directly or indirectly, over one or more buses 450. The sensor unit 115-*a* may, in some examples, have the internal power supply 435, such as a small battery, to facilitate independent operation. In other examples, the sensor unit 115-*a* may be wired into a building electrical system.

The memory module 415 may include random access memory (RAM) or read-only memory (ROM). The memory module 415 may store computer-readable, computer-executable software (SW) code 420 containing instructions that are configured to, when executed, cause the processor module 410 to perform various functions described herein for communicating, for example, home occupancy data. Alternatively, the software code 420 may not be directly executable by the processor module 810, but may be configured to cause the sensor unit 115-a (e.g., when compiled and executed) to perform various of the functions described herein.

The processor module 410 may include an intelligent hardware device, e.g., a CPU, a microcontroller, an ASIC, etc. The processor module 410 may process information received through the transceiver 440 or information to be sent to the transceiver 440 for transmission through the antenna 445. The processor module 410 may handle, alone or in connection with the transceiver 440, various aspects of signal processing as well as determining and transmitting home security and environment data.

The transceiver 440 may include a modem configured to modulate packets and provide the modulated packets to the antennas 445 for transmission, and to demodulate packets received from the antennas 445. The transceiver 440 may, in some examples, be implemented as one or more transmitter modules and one or more separate receiver modules. The transceiver 440 may support smart home data-related communications. The transceiver 440 may be configured to communicate bi-directionally, via the antennas 445 and communication link 120-a, with, for example, the mobile robotic device 125 and remote computing device 135 (via network 130 of FIG. 1). Communications through the transceiver 440 may be coordinated, at least in part, by the communications manager 425. While the sensor unit 115-a may include a single antenna, there may be embodiments in which the sensor unit 115-a may include multiple antennas 445.

Figure 5:
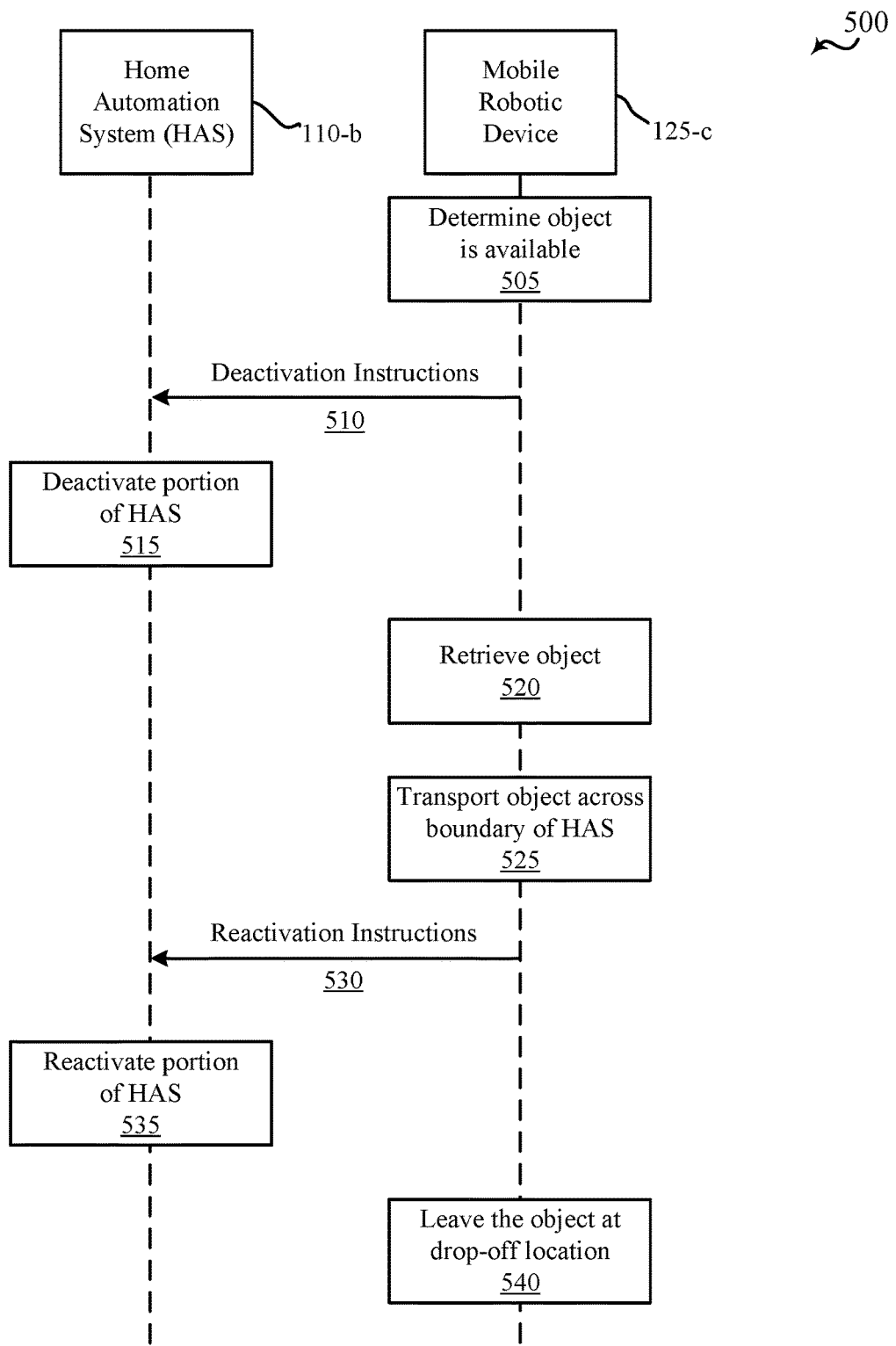
FIG. 5 is a swim diagram of one example of a method of the delivery home automation system in accordance with various embodiments.

FIG. 5 is a swim diagram 500 of one example of a method of the delivery home automation system of the system of FIG. 1. The diagram 500 includes a home automation system 110-b and a mobile robotic device 125-c. The home automation system 110-b may be an example of one or more aspects of the home automation system 110 of FIGS. 1 and 2. The mobile robotic device 125-c may be an example of one or more aspects of the mobile robotic device 125 of FIGS. 1-3. FIG. 5 illustrates just one example method for retrieval and transportation of an object, while many other examples exist.

The mobile robotic device 125-c may determine that an object is available for transportation across a boundary of the home automation system 110-b at block 505. There are many ways in which the mobile robotic device 125-c may determine that the object is available, including a direct observation of the object by the mobile robotic device 125-c, receiving a notification regarding the presence of the object by a network, user or the home automation system 110-b, determining that the object may be delivered via tracking information or a message to or from a user, or the like.

The mobile robotic device 125-c may decide to retrieve the object. In some examples, this requires permission from the home automation system 110-b or a user. The mobile robotic device 125-c may provide a deactivation instruction 510 to deactivate a portion of the home automation system 110-b to the home automation system 110-b. The instructions may be a signal notification and may include an identification of an entryway the mobile robotic device 125-c wants to be unlocked, a duration for the disabling of the portion of the home automation system 110-b, an identification of the portion for deactivation, or any other information that the home automation system 110-b may use to allow the mobile robotic device 125-c to ingress or egress across the boundary.

Upon receiving the deactivation instructions 510, the home automation system 110-b may deactivate the portion at block 515. The home automation system 110-b may provide a notification to the mobile robotic device 125-c that the portion is deactivated. In some examples, the home automation system 110-b may request permission from an authorized user of the home automation system 110-b before deactivating the portion. In some examples, the home automation system 110-b may just deactivate the portion for a period of time. The home automation system 110-b may inform the mobile robotic device 125-c what the period of time is that the portion will remain deactivated. Deactivating a portion of the home automation system 110-b may include unlocking one or more doors or windows, opening a garage door, disarming an alarm system which may pertain to those doors or windows, while maintaining the rest of the home automation system 110-b activated.

The mobile robotic device 125-c may approach the object and gather information about it. The information may be used to determine whether the object is safe to transport across the boundary of the home automation system 110-b. If the object is deemed safe or an instruction to move the object has been received from the home automation system 110-b or an authorized user, the mobile robotic device 125-c may retrieve the object at block 520. Retrieving the object may include picking up or otherwise lifting the object, attaching the object, or having the object placed in the mobile robotic device 125-c.

Once the mobile robotic device 125-c has the object, it may transport the object across the boundary of the home automation system 110-b at block 525. This may include bringing an object inside from outside or removing an object from inside the boundary. Transporting the object may include carrying the object, flying with the object, dragging the object, or the like.

Once the mobile robotic device 125-c has crossed the boundary with the object, or crossed and then returned, the mobile robotic device 125-c may provide a reactivation instruction 530 to the home automation system 110-b to reactivate the portion. The home automation system 110-b may reactivate the portion based on the reactivation instruction 530 if it has not already done so at block 535. In some examples, if the home automation system 110-b has automatically reactivated the portion, the mobile robotic device 125-c does not send the reactivation instructions 530. In examples where the mobile robotic device 125-c is locked inside or outside of the boundary when it should be on the other side, the mobile robotic device 125-c may transmit another deactivation signal 510.

The mobile robotic device 125-c may leave the object at a desired drop-off location at block 540. If the object is a delivery package, for example, the drop-off location may be a room associated with the one or more items delivered (e.g., food or utensils may be dropped off in a kitchen, hygiene items in a bathroom, clothes in a bedroom, etc.). If the object is garbage or recycling, the drop-off location may be a curb-side pickup area.

Figure 6:
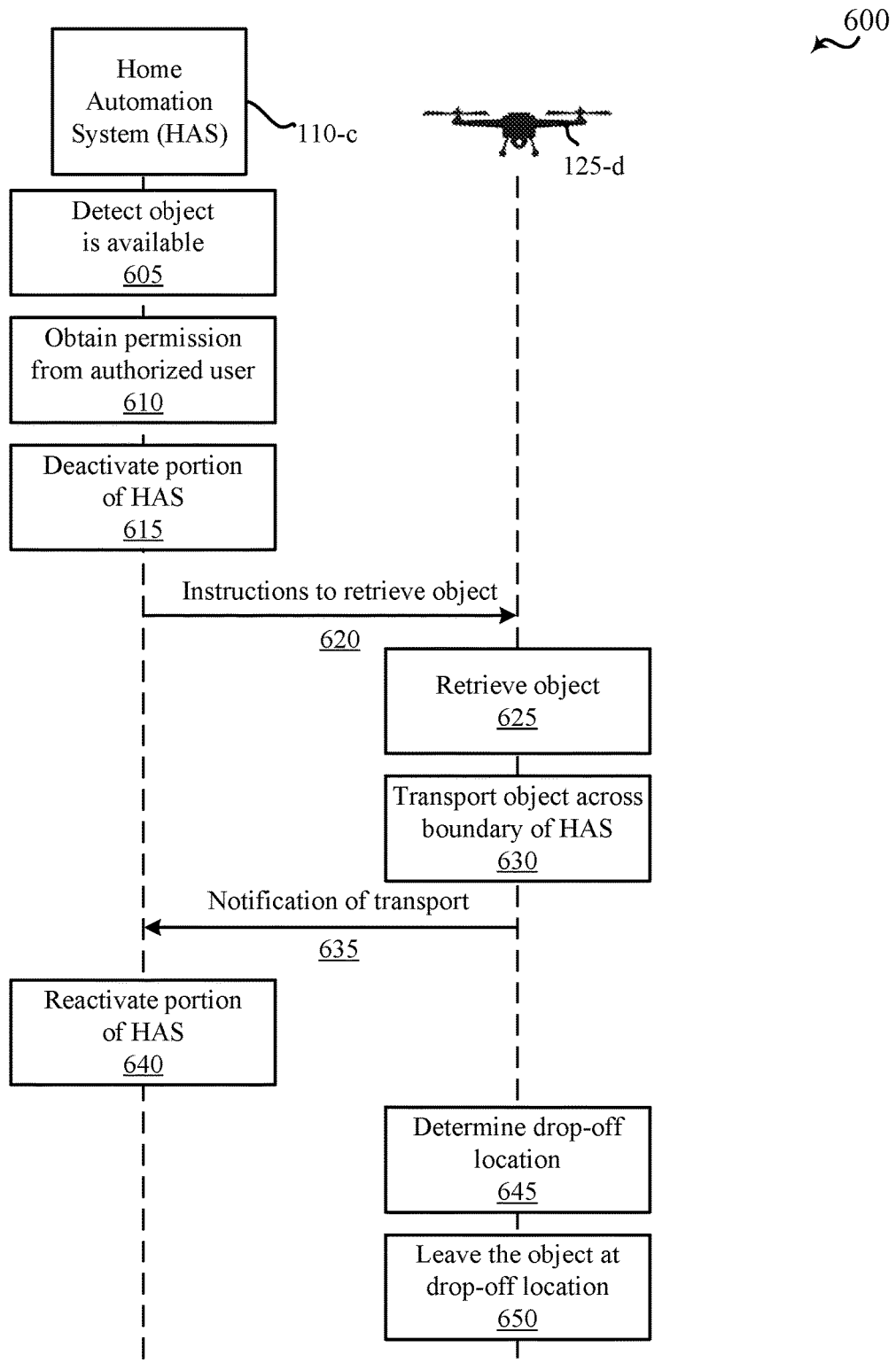
FIG. 6 is a swim diagram of another example of a method of the delivery home automation system in accordance with various embodiments.

FIG. 6 is a swim diagram 600 of one example of a method of the delivery home automation system of the system of FIG. 1. The diagram 600 includes a home automation system 110-c and a mobile robotic device 125-d. The home automation system 110-c may be an example of one or more aspects of the home automation system 110 of FIGS. 1, 2, and 5. The mobile robotic device 125-d may be an example of one or more aspects of the mobile robotic device 125 of FIGS. 1-3 and 5. FIG. 6 illustrates just one example method for retrieval and transportation of an object, while many other examples exist. Some of the steps included in diagram 600 that are similar to those discussed in FIGS. 1-5 may not be repeated here for the sake of brevity.

The home automation system 110-*c* may determine that an object is available for transportation across a boundary of the home automation system 110-*c* at block 605. There are many ways in which the home automation system 110-*c* may determine that the object is available, including a direct observation of the object by the home automation system 110-*c*, an observation of the object by the mobile robotic device 125-*d*, receiving a notification regarding the presence of the object by a network, user or the mobile robotic device 125-*d*, determining that the object may be delivered via tracking information or a message to or from a user, or the like.

The home automation system 110-*c* may decide to retrieve the object. In some examples, this requires permission from a user or the mobile robotic device 125-*d*. In this example, the home automation system 110-*c* obtains permission for the object to be relocated by an authorized user. The home automation system 110-*c* may deactivate a portion of the home automation system 110-*c* at block 615. The home automation system 110-*c* may provide a retrieval instruction 620 to the mobile robotic device 125-*d* to retrieve the object. The instructions may be a signal notification and may include an identification of an entryway which the home automation system 110-*c* has unlocked, a duration for the disabling of the portion of the home automation system 110-*b*, an identification of the object, a drop-off location of the object, or any other information that the mobile robotic device 125-*d* may use to allow to ingress or egress across the boundary with the object.

Upon receiving the action instructions 620 to retrieve the object, the mobile robotic device 125-*d* may approach the object, gather information about it, and retrieve the object at block 625. The mobile robotic device 125-*d* has the object, it may transport the object across the boundary of the home automation system 110-*c* at block 630. The mobile robotic device 125-*d* may provide a notification 635 to the home automation system 110-*c* that the object has been transported.

Once the mobile robotic device 125-*c* has crossed the boundary with the object, or crossed and then returned, the home automation system 110-*c* may reactivate the portion at block 640. The home automation system 110-*b* may reactivate the portion based on the notification 635 if it has not already done so.

The mobile robotic device 125-*c* may determine a drop-off location at 645. The drop-off location may be identified in the action instructions 620. In other examples, the mobile robotic device 125-*d* may determine the drop-off location based on one or more properties of or information about the object. In some examples, the drop-off location is a clear space on an item of furniture which the mobile robotic device 125-*d* has detected. In other examples, the drop-off location may be a clear and out-of-the-way space on a floor.

Figure 7:
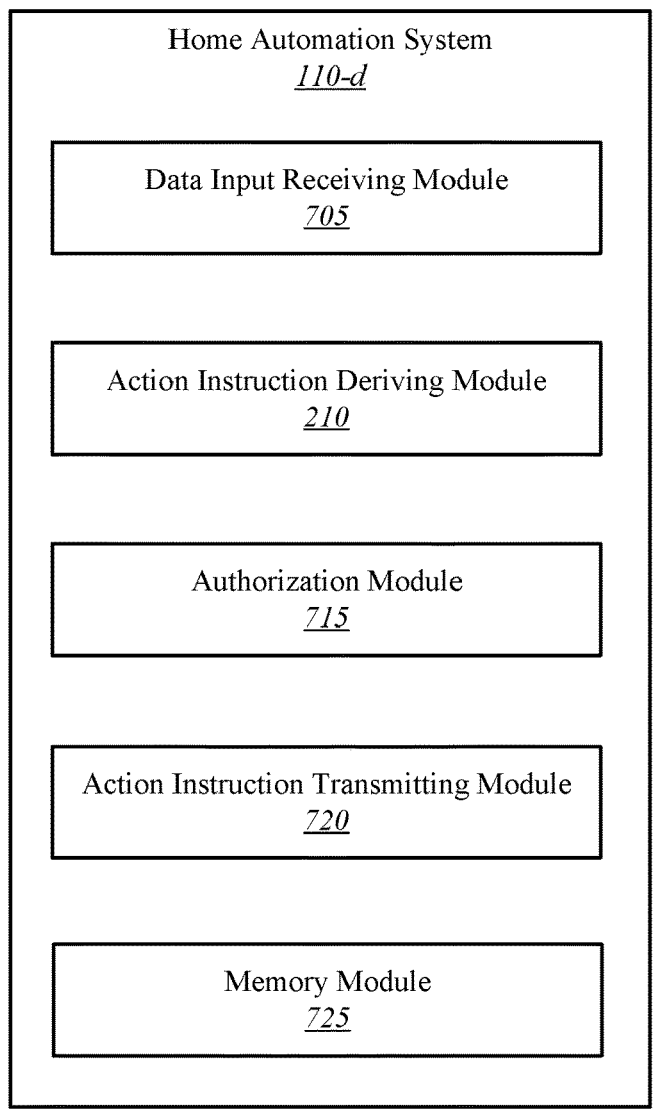
FIG. 7 is a block diagram of one example of a home automation system in accordance with various embodiments.

FIG. 7 is a block diagram of one example of a home automation system 110-*d* in accordance with various embodiments. The home automation system 110-*d* may be an example of one or more aspects of home automation system 110 of FIGS. 1-2 and 5-6, for use in receiving input data, deactivating and reactivating a portion of the home automation system 110-*d* and communicating action instructions derived based on the inputted data to the mobile robotic device 125 of FIGS. 1-3 and 5-6. In some examples, the home automation system 110-*a* may include a data input receiving module 705, an action instruction deriving module 710, an authorization module 715, and an action instruction transmitting module 720. Each of these components may be in communication with each other.

The components of the home automation system 110-*d* may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structure/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The home automation system 110-*d* may be configured to receive data relating to home security, environment, occupancy, or other data relevant to the home or property via data input receiving module 705. As described above with reference to FIG. 1, home security, environment, occupancy, deliveries, or other relevant property data may be collected by one or more sensor units 115, and may be communicated to data input receiving module 705. Alternatively or in addition, home security, etc. data may be inputted directly by the user into the home automation system 110-*d* via data input receiving module 705, or may be inputted at remote computing device 135 and communicated to data input receiving module 705 via wired or wireless communication link 120 and network 130, as shown in FIG. 1. In some embodiments, data may be received at the data input receiving module 705 from the mobile robotic device 125 via a wired or wireless communication link 120. In some embodiments, one or more instructions to move an object may be received at data input receiving module 705.

Data received at the data input receiving module 705 may be communicated to the action instruction deriving module 710, which may derive action instructions based on the received input data. For example, the action instruction deriving module 710 may derive action instructions for a mobile robotic device 125 to retrieve an object from outside and bring it inside or remove an object from inside and take it outside. The action instructions may include a time frame in which to move the object or a specific time the object should be moved.

Action instructions derived by the action instruction deriving module 710 may then be communicated to the authorization module 715. The authorization module 715 may be used to obtain permission for a portion of the home automation system 110-*d* to be deactivated.

The memory module 725 may include RAM or ROM. Memory module 725 may store computer-readable, computer-executable SW code containing instructions that are configured to, when executed, cause an action instruction transmitting module 720 to perform various functions described herein for communicating, for example, action instructions. Alternatively, the software code may not be directly executable by the action instruction transmitting module 720, but may be configured to cause the home automation system 110-*d* (e.g., when compiled and executed) to perform various of the functions described herein.

The action instruction transmitting module 720 may include a modem configured to modulate packets and provide the modulated packets to antennas for transmission, and to demodulate packets received from the antennas. The transmitting module 720 may, in some examples, be implemented as one or more transmitter modules and one or more separate receiver modules. The transmitting module 720 may support action instruction-related communications. The transmitting module 720 may be configured to communicate, bi-directionally, via antennas and communication link 120 (as shown in FIG. 1), with, for example, mobile robotic device 125 and/or remote computing device 135 (via network 130). In some embodiments, communications through the transmitting module 720 may be coordinated, at least in part, by a communications manager.

Figure 8:
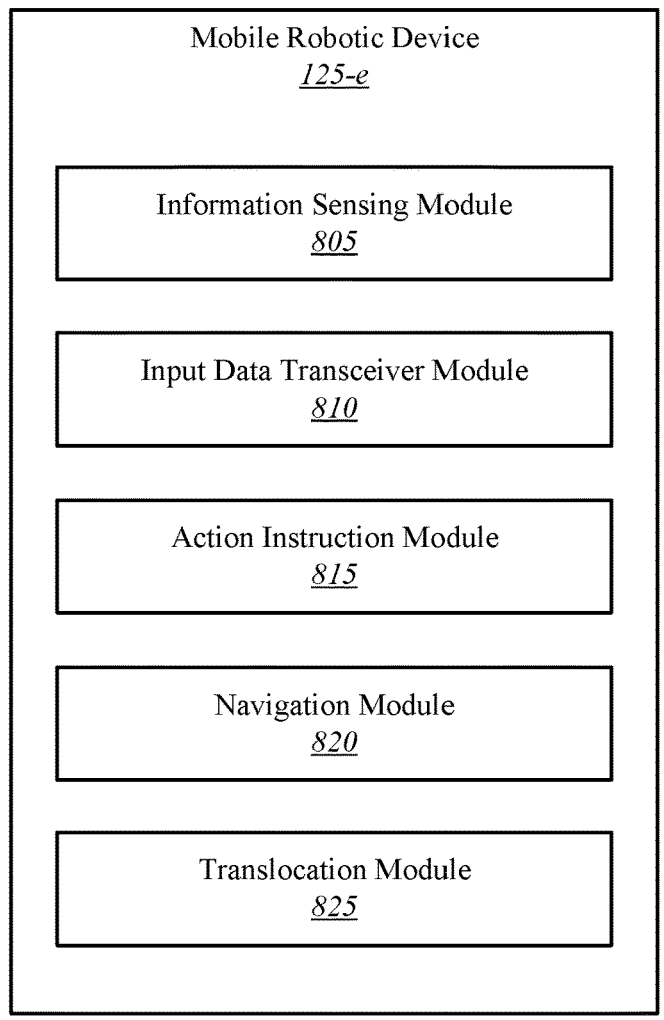
FIG. 8 is a block diagram of one example mobile robotic device in accordance with various embodiments.

FIG. 8 is a block diagram of one example mobile robotic device 125-*e* in accordance with various embodiments. The mobile robotic device 125-*e* may be an example of one or more aspects of the mobile robotic device 125-*e* of FIGS. 1-3 and 5-6. The components of the mobile robotic device 125-*e* may be configured to implement aspects discussed above with respect to FIGS. 1-3 and 5-6, and those aspects may not be repeated here for the sake of brevity. Moreover, the components of the mobile robotic device 125-*e* may be configured to implement aspects discussed below with respect to FIGS. 9-12, and those aspects may not be repeated here also for the sake of brevity.

In some embodiments, the mobile robotic device 125-*e* may be operable to receive inputted data from one or more sensors associated with the mobile robotic device 125-*e*, and transmit the inputted data to the home automation system 110. In other embodiments, the mobile robotic device 125-*e* may be operable to process inputted data to obtain action instructions. In some examples, the mobile robotic device 125-*e* may include an information sensing module 805, an input data transceiver module 810, an action instruction module 815, an navigation module 820, and translocation module 825. Each of these components may be in communication with each other.

The information sensing module 805 may be operable to receive data from a plurality of sensors positioned on or integrated with mobile robotic device 125-*e*. For example, the mobile robotic device 125-*e* may comprise any one or more of the sensors described with respect to FIGS. 1-3. The information sensing module 805 may collect data gathered by the one or more sensors of the mobile robotic device 125-*e*, and may communicate the collected data to input data transceiver module 810. The input data transceiver module 810 may in turn communicate the sensor-gathered data to the home automation system 110 or a user. The home automation system 110 may then process the received data in order to obtain action instructions for the mobile robotic device 125-*e*.

The mobile robotic device 125-*e* may receive the action instructions at the action instruction module 815. Action instructions received at the action instruction module 815 may be implemented by the mobile robotic device 125-*e*. For example, in one embodiment, mobile robotic device 125-*e* may have received at action instruction module 815 action instructions from home automation system 110 of FIG. 1 directing mobile robotic device 125-*e* to move an object. The "move the object" action instructions received at the action instruction module 815 initialize the object retrieval functionality of the mobile robotic device 125-*e*. The navigation module 820 may navigate the mobile robotic device 125-*e* to the object while attempting to avoid obstructions. The translocation module 825 may cause the mobile robotic device 125-*e* to pick up, move, and drop off the object.

Figure 9:
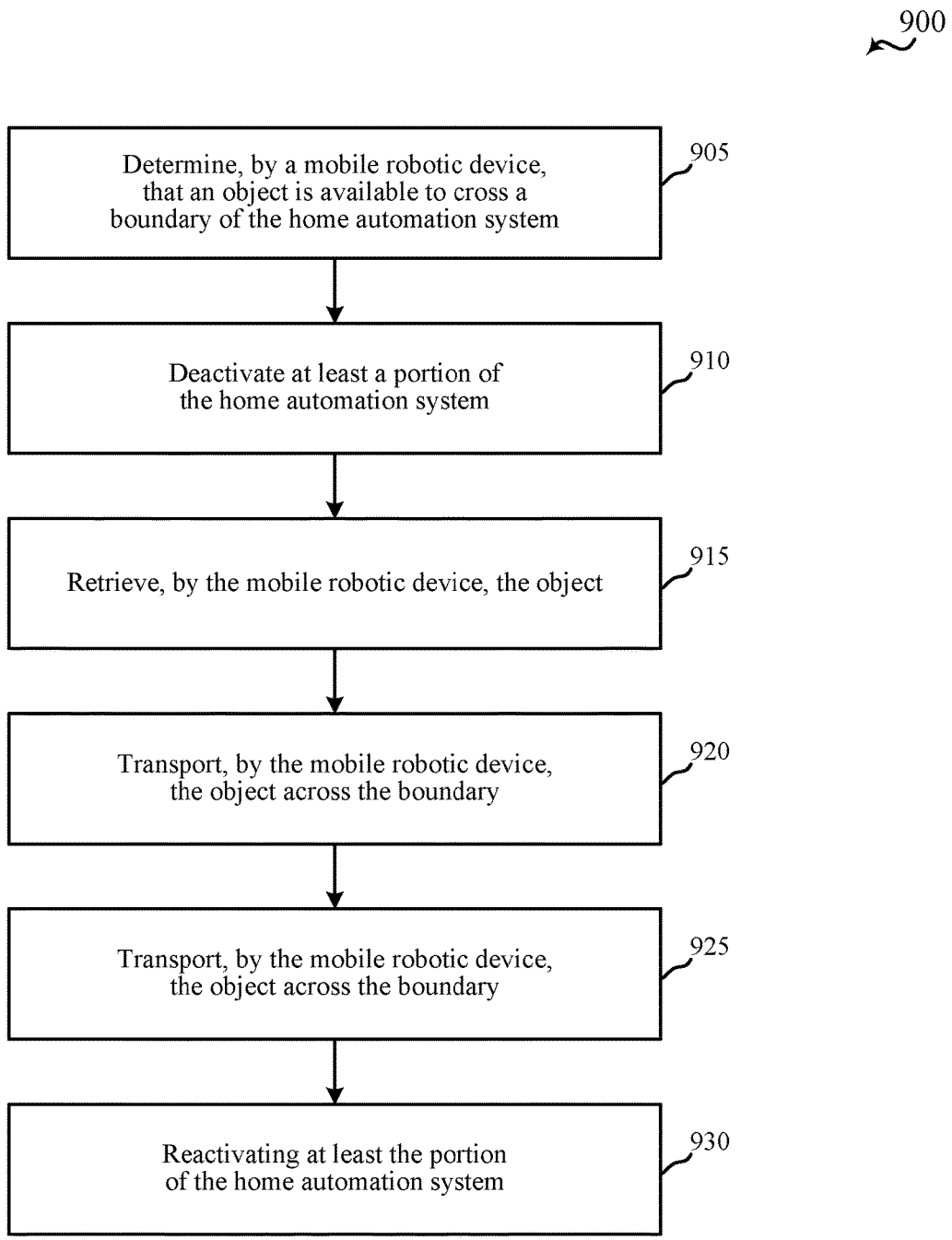
FIGS. 9-12 are flow diagrams illustrating methods for retrieval and transportation of a mobile robotic device of FIG. 1 according to various embodiments.

FIG. 9 is a flow diagram illustrating an example method 900 for retrieval and transportation of a mobile robotic device of FIG. 1 according to various embodiments. For clarity, the method 900 is described below with reference to aspects of one or more of the home automation system 110, the one or more sensors 115, the network 130, the remote computing device 135, and/or mobile robotic device 125 described with reference to FIGS. 1-8. In some examples, the remote computing device 135 and/or the mobile robotic device 125 may execute one or more sets of codes to control the functional elements of the remote computing device 135 or mobile robotic device 125 to perform the functions described below.

At block 905, the method 900 includes determining, by a mobile robotic device 125, that an object is available to cross a boundary of the home automation system. The mobile robotic device 125 may detect the object via one or more sensors of the mobile robotic device. In another example, the mobile robotic device 125 may receive a notification from the home automation system identifying the object and the mobile robotic device 125 may determine that the object is available based on this notification. In some examples where the object is a delivery package, tracking information may be used to determine the object is available. Alternatively, a delivery service may send a notification that the delivery package has been delivered. In other examples, the method 900 may include determining a time window for delivery of the delivery package and looking for the object during the time window.

At block 910, the method 900 includes deactivating at least a portion of the home automation system. The home automation system 110 may disarm or unlock a door or window for the mobile robotic device to travel through, while leaving other portions of the home automation system 110 locked or activated.

In some examples of the method 900, the home automation system 110 seeks authorization to deactivate a portion of the home automation system 110. The home automation system 110 may provide an alert to an administrator of the home automation system 110 that the object has arrived. The home automation system 110 may request authorization to deactivate the portion of the home automation system 110 based at least in part on the arrival of the object. The home automation system 110 may receive authorization to temporary deactivate at least the portion of the home automation system 110, which is only performed upon receiving the authorization. In some examples, the home automation system 110 provides an alert to the administrator based at least in part on the deactivating.

At block 915, the method 900 includes retrieving, by the mobile robotic device, the object. In some examples, the method 900 includes receiving, at the mobile robotic device 125, an instruction from the home automation system 110 to retrieve the object. The object may be a package to be delivered, garbage, recycling, one or more plants, a pet, or an item requested by a user of the home automation system.

At block 920, the method 900 includes transporting, by the mobile robotic device 125, the object across the boundary. Some examples of method 900 include performing a safety inspection of the object before transporting the object across the boundary. In some examples, the mobile robotic device 125 may not transport the object unless it passes the safety inspection. In some examples, a user may perform the safety inspection remote via the mobile robotic device 125.

At block 925, the method 900 includes leaving, by the mobile robotic device, the object at a drop-off location. Some examples of method 900 may include determining the drop-off location for the delivery package based at least on a name on the delivery package, a type of one or more items delivered, a code on the delivery package, tracking information, instructions from the home automation system, instructions from an administrator of the home automation system, or combinations thereof. Some examples include detecting the drop-off location as a clear space to place the object.

In some examples, the object is a delivery package. In such an example, the mobile robotic device 125 may detect, via one or more sensors, that the delivery package is located outside the boundary of the home automation system. Deactivating at least the portion of the home automation system 110 may further include deactivating a security lock or alarm system for a door associated with the home automation system 110, wherein transporting the object across the boundary further includes carrying, by the mobile robotic device 125, the delivery package inside the boundary of the home automation system through the door.

At block 930, the method 900 includes reactivating at least the portion of the home automation system 110. The method 900 may reactivate the portion of the home automation system 110 before or after the mobile robotic device 125 has dropped off the item.

Figure 10:
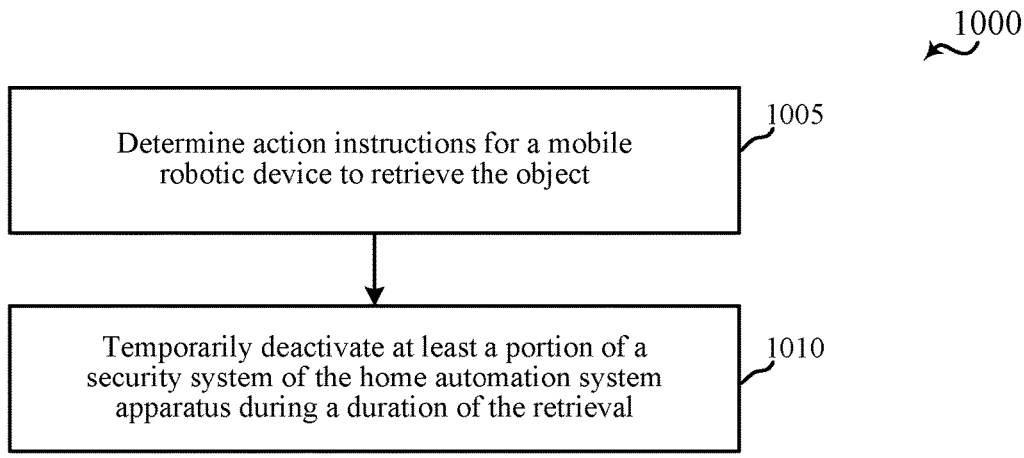

FIG. 10 is a flow diagram illustrating an example method 1000 for retrieval and transportation of a mobile robotic device of FIG. 1 according to various embodiments. For clarity, the method 1000 is described below with reference to aspects of one or more of the home automation system 110, the one or more sensors 115, the network 130, the remote computing device 135, and/or mobile robotic device 125 described with reference to FIGS. 1-9. In some examples, the remote computing device 135 and/or the mobile robotic device 125 may execute one or more sets of codes to control the functional elements of the remote computing device 135 or mobile robotic device 125 to perform the functions described below.

The method 1000 may include determining action instructions for a mobile robotic device 125 to retrieve the object at block 1005.

In some examples, the object is a delivery package, and wherein the method 1000 further includes scanning a delivery area with one or more cameras, detecting a new object within the scanned area, and determining that the new object is the delivery package.

At block 1010, the method 1000 may include temporarily deactivating at least a portion of a security system of the home automation system apparatus during a duration of the retrieval. As used herein, a portion of a security system is also referred to as a portion of the home automation system.

In some examples, the method 1000 may further include requesting authorization from an administrator of the home automation system to temporarily deactivate at least the portion of the security system of the home automation system apparatus for retrieval of the object. The method 1000 may also include receiving the authorization to temporarily deactivate at least the portion of the security system and temporarily deactivate at least the portion of the security system only in response to receiving the authorization.

In another example, the method 1000 further includes determining a door of a building associated with the home automation system for which the object should pass through, deactivating a security system for the door, monitoring the location of the mobile robot device, and reactivating the security system for the door once the mobile robot device has crossed the door with the object.

In examples where the object is a delivery package, the method 1000 further includes determining a time window that the delivery package is expected to arrive based on tracking information and identifying the delivery package using sensor data during the time window.

In additional examples, the method 1000 determines a drop-off location for the delivery package based on one or more of the tracking information or information located on the delivery package and includes the drop-off location in the action instructions.

Figure 11:
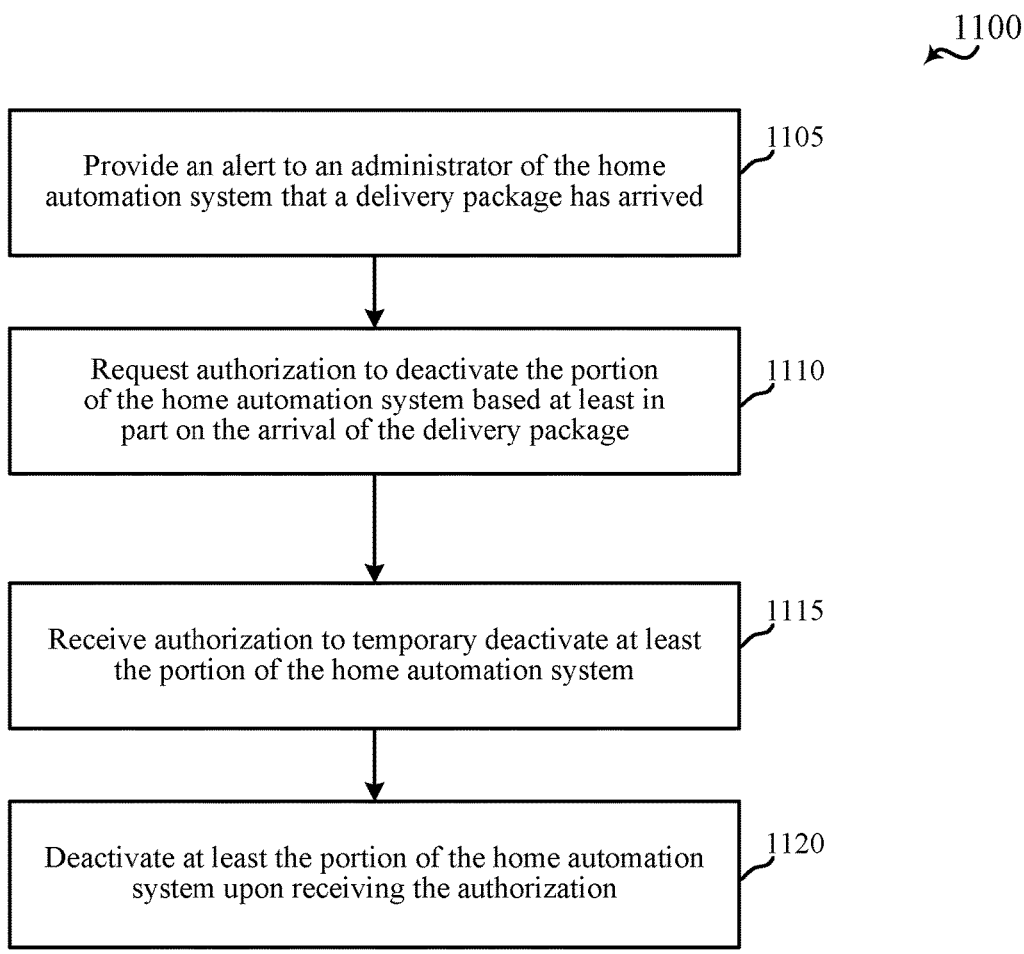

FIG. 11 is a flow diagram illustrating an example method for retrieval and transportation of a mobile robotic device of FIG. 1 according to various embodiments. For clarity, the method 1100 is described below with reference to aspects of one or more of the home automation system 110, the one or more sensors 115, the network 130, the remote computing device 135, and/or mobile robotic device 125 described with reference to FIGS. 1-10. In some examples, the remote computing device 135 and/or the mobile robotic device 125 may execute one or more sets of codes to control the functional elements of the remote computing device 135 or mobile robotic device 125 to perform the functions described below.

The method 1100 may include providing an alert to an administrator of the home automation system that a delivery package has arrived at block 1105. This may be performed by the home automation system or by a mobile robotic device.

At block 1110, the method 1100 includes requesting authorization to deactivate the portion of the home automation system based at least in part on the arrival of the delivery package. At block 1115, the method 1100 may include receiving authorization to temporarily deactivate at least the portion of the home automation system. At block 1120, the method 1100 includes deactivating at least the portion of the home automation system upon receiving the authorization.

Figure 12:
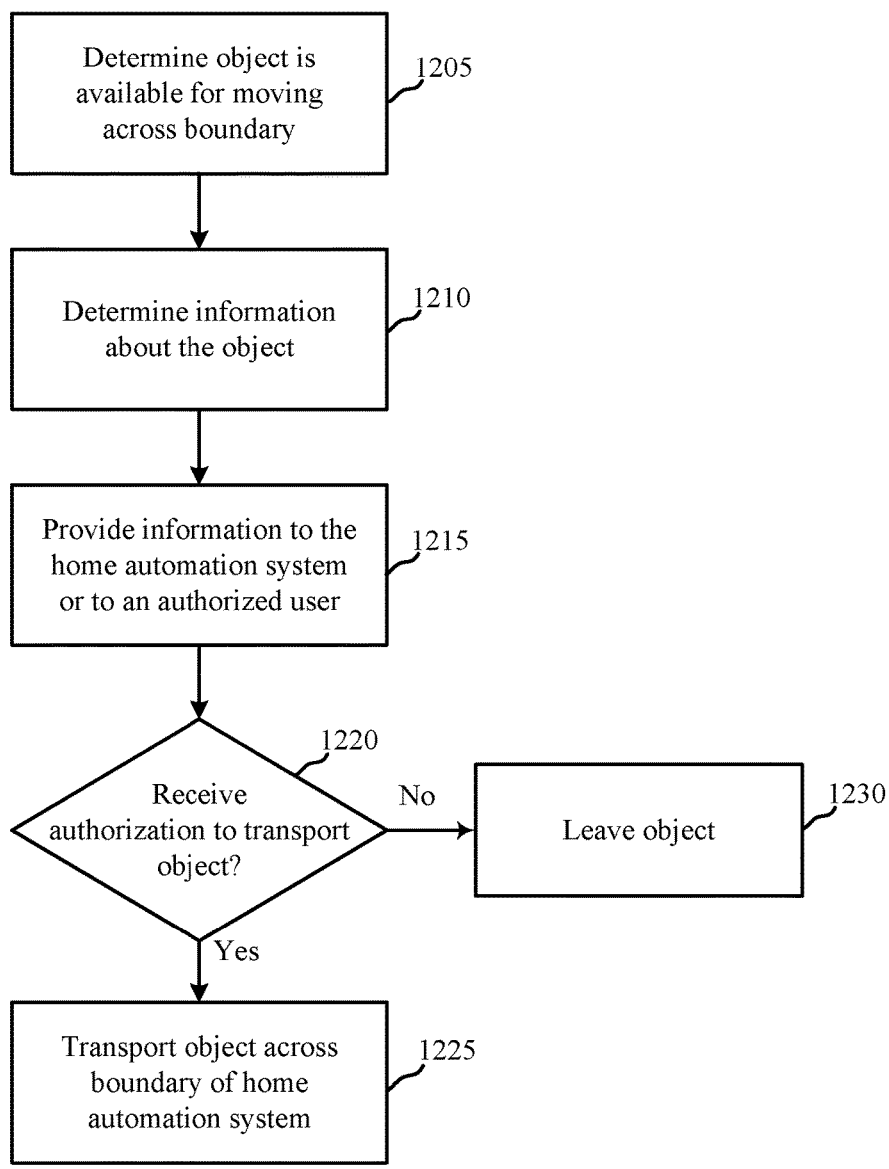

FIG. 12 is a flow diagram illustrating an example method 1200 for retrieval and transportation of a mobile robotic device of FIG. 1 according to various embodiments. For clarity, the method 1200 is described below with reference to aspects of one or more of the home automation system 110, the one or more sensors 115, the network 130, the remote computing device 135, and/or mobile robotic device 125 described with reference to FIGS. 1-11. In some examples, the remote computing device 135 and/or the mobile robotic device 125 may execute one or more sets of codes to control the functional elements of the remote computing device 135 or mobile robotic device 125 to perform the functions described below.

At block 1205, the method 1200 includes determining that an object is available for moving across the boundary. At block 1210, the method 1200 includes determining information about the object. The information may be size, weight, color, labelling, type, tracking information, or the like. The method 1200 may provide this information to the home automation system or to an authorized user at block 1215. At block 1220, the method 1200 determines whether authorization to transport the object has been received. If not, the method 1200 does not transport the object across the home automation system boundary at block 1230. The method 1200 may include leaving the object alone or moving it to another location without crossing the boundary. If authorization to move the object is received, the method 1200 includes transporting the object across the boundary of the home automation system at block 1225.

Regarding the signals described herein, those skilled in the art will recognize that a signal may be directly transmitted from a first block to a second block, or a signal may be modified (e.g., amplified, attenuated, delayed, latched, buffered, inverted, filtered, or otherwise modified) between the blocks. Although the signals of the above described embodiments are characterized as transmitted from one block to the next, other embodiments of the present systems and methods may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures may be implemented to achieve the same functionality.

The process parameters and sequence of steps described and/or illustrated herein are given by way of example only and may be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of" In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A method for robotic delivery in a home automation system, comprising:
   determining a time window for delivery of a delivery package;
   identifying, via one or more sensors of a mobile robotic device, that the delivery package is located outside a boundary of a home automation system during the time window and is available to cross the boundary of the home automation system;
   deactivating at least a portion of the home automation system by deactivating a security lock or alarm system for a door associated with the home automation system;
   retrieving, by the mobile robotic device, the delivery package;
   transporting, by the mobile robotic device, the delivery package across the boundary of the home automation system through the door;
   leaving, by the mobile robotic device, the delivery package at a drop-off location; and
   reactivating at least the portion of the home automation system.

2. The method of claim 1, further comprising:
   detecting, by the mobile robotic device, the delivery package via the one or more sensors of the mobile robotic device.

3. The method of claim 1, further comprising:
   receiving, at the mobile robotic device, a notification from the home automation system identifying the delivery package,
   wherein determining that the delivery package is available to cross the boundary of the home automation system is based at least in part on the notification.

4. The method of claim 1, further comprising:
   receiving, at the mobile robotic device, an instruction from the home automation system to retrieve the delivery package.

5. The method of claim 1, further comprising:
   determining that the delivery package has been delivered via tracking information.

6. The method of claim 1, further comprising:
   determining the drop-off location for the delivery package based at least on a name on the delivery package, a type of one or more items delivered, a code on the delivery package, tracking information, instructions from the home automation system, instructions from an administrator of the home automation system, or combinations thereof.

7. The method of claim 1, further comprising:
   providing an alert to an administrator of the home automation system that the delivery package has arrived;
   requesting an authorization to deactivate the portion of the home automation system based at least in part on an arrival of the delivery package;
   receiving the authorization to temporary deactivate at least the portion of the home automation system;
   wherein deactivating at least the portion of the home automation system is only performed upon receiving the authorization.

8. The method of claim 7, further comprising:
   providing an alert to the administrator based at least in part on the deactivating.

9. The method of claim 1, further comprising:
performing a safety inspection of the delivery package, wherein transporting the delivery package across the boundary is only performed when the delivery package passes the safety inspection.

10. The method of claim 1, wherein the delivery package is a package to be delivered, garbage, recycling, one or more plants, a pet, or an item requested by a user of the home automation system.

11. The method of claim 1, further comprising:
detecting the drop-off location as a clear space to place the delivery package.

12. A mobile robot device, comprising:
one or more sensors or devices configured to:
determine a time window that a delivery package is expected to arrive based on tracking information;
identify, using sensor data, that the delivery package is located outside a boundary of a home automation system during the time window and is available to cross a boundary of the home automation system;
deactivate at least a portion of the home automation system;
retrieve the delivery package;
transport the delivery package across the boundary;
leave the delivery package at a drop-off location; and
reactivate at least the portion of the home automation system.

13. A home automation system apparatus, comprising:
one or more sensors to detect that the delivery package is available to cross a boundary of the home automation system;
a processor to:
determine a time window that the delivery package is expected to arrive based on tracking information;
identify the delivery package using sensor data during the time window;
determine action instructions for a mobile robotic device to retrieve the delivery package; and
temporarily deactivate at least a portion of a security system of the home automation system apparatus during a duration of the retrieval; and
a transmitter to communicate the action instructions to the mobile robotic device that causes the mobile robotic device to retrieve the delivery package, transport the delivery package across the boundary of the home automation system, and leave the delivery package at a drop-off location.

14. The home automation system apparatus of claim 13, wherein the one or more sensors to detect that the delivery package is available further comprises:
scan a delivery area with one or more cameras;
detect a new object within the scanned delivery area; and
determine that the new object is the delivery package.

15. The home automation system apparatus of claim 13, the processor to further:
request an authorization from an administrator of the home automation system to temporarily deactivate at least the portion of the security system of the home automation system apparatus for retrieval of the delivery package;
receive the authorization to temporarily deactivate at least the portion of the security system; and
temporarily deactivate at least the portion of the security system only in response to receiving the authorization.

16. The home automation system apparatus of claim 13, the processor to further:
determine a door of a building associated with the home automation system for which the delivery package should pass through;
deactivate the security system for the door;
monitor a location of the mobile robotic device; and
reactivate the security system for the door once the mobile robotic device has crossed the door with the delivery package.

17. The home automation system apparatus of claim 13, wherein the processor is further to:
determine a drop-off location for the delivery package based on one or more of the tracking information or information located on the delivery package; and
include the drop-off location in the action instructions.

* * * * *